United States Patent
Monteith (10) Patent No.: US 7,378,016 B2
(45) Date of Patent: May 27, 2008

(54) DEVICE FOR INCREASING PH OF AN AQUEOUS STREAM

(75) Inventor: Joseph Gordon Monteith, Toronto (CA)

(73) Assignee: Green Turtle Americas Ltd., Charlotte, NC (US)

( * ) Notice: Subject to any disclaimer, the term of this patent is extended or adjusted under 35 U.S.C. 154(b) by 94 days.

(21) Appl. No.: 11/287,846

(22) Filed: Nov. 28, 2005

(65) Prior Publication Data

US 2006/0076284 A1 Apr. 13, 2006

Related U.S. Application Data

(62) Division of application No. 10/129,117, filed on May 14, 2002, now abandoned.

(51) Int. Cl.
*C02F 1/68* (2006.01)
(52) U.S. Cl. .................. 210/206; 422/140; 422/261
(58) Field of Classification Search ............ 210/206, 210/198.1, 201; 422/261, 140, 275, 274
See application file for complete search history.

(56) References Cited

U.S. PATENT DOCUMENTS

| | | | | |
|---|---|---|---|---|
| 796,087 | A | * | 8/1905 | Reisert .................. 210/738 |
| 948,785 | A | * | 2/1910 | Lajoie .................... 210/202 |
| 3,761,534 | A | | 9/1973 | Sun et al. |
| 3,772,193 | A | | 11/1973 | Nelli et al. |
| 3,849,774 | A | | 11/1974 | Barth |
| 4,415,453 | A | | 11/1983 | Witt et al. |
| 4,891,164 | A | | 1/1990 | Gaffney et al. |
| 5,427,748 | A | | 6/1995 | Wiedrich et al. |
| 5,843,308 | A | * | 12/1998 | Suozzo et al. ........... 210/195.1 |

FOREIGN PATENT DOCUMENTS

| | | | |
|---|---|---|---|
| JP | 57 002374 | | 1/1982 |
| JP | 0918775 | * | 7/1997 |
| JP | 09187775 | | 7/1997 |
| WO | WO 85/01280 | | 3/1985 |

OTHER PUBLICATIONS

Machine translation of JP 09187775, detailed description pp. 1-8, Jul. 1997.*

* cited by examiner

*Primary Examiner*—Duane Smith
*Assistant Examiner*—Douglas J. Theisen
(74) *Attorney, Agent, or Firm*—Shoemaker and Mattare (57) ABSTRACT

A device is provided for increasing the pH of an acidic aqueous stream, which may result from commercial activity in petroleum, mining, metal finishing and food processing sectors, among others. A container defines an upright reactor portion with a cross-section that increases upwardly, along with inlet and outlet conduits connected to an inlet and an outlet between which the reactor portion is located. The conical portion contains a bed of substantially water-insoluble alkaline salt particulate, such as MgSO, the bed being such that, when the pH of the inflowing aqueous stream is below 7, contact between the particulate and the aqueous stream will raise the pH of the outflowing stream to a level above that of the inflowing stream.

14 Claims, 5 Drawing Sheets

DEVICE FOR INCREASING PH OF AN AQUEOUS STREAM

This application is a divisional of U.S. patent application No. 10/129117, filed May 14, 2002, now abandoned incorporated herein by reference.

This invention relates generally to wastewater treatment systems, and has to do particularly with a device and a process by which the pH of wastewater can be controlled.

BACKGROUND OF THIS INVENTION

In any growing community, the need for fresh water keeps pace with the population. Where fresh water is derived from rivers and freshwater lakes, it is common for the system effluent (wastewater) to be treated and then returned to the original source. In order to avoid harming the environment, local legislation usually establishes minimal limits for the quality of the wastewater that is discharged into the environment.

One such characteristic is the pH level (acid-base level). Specifically, it is regarded as desirable that the pH of wastewater being discharged into the environment should not drop below 6 (a pH of 7 being neutral).

To control the pH of the wastewater, particularly involving industrial aqueous effluent, a number of different processes are presently in common use. These processes usually are based on the addition of carefully measured alkaline reagents to the effluent, using a variety of process control mechanisms.

All of these pH control systems rely on the continuous measurement of the pH of the treated water and often also on the pH of the raw effluent. The measurement data thus obtained are then used through a control mechanism to add the required amount of reagent to achieve the desired result.

This prior approach is subject to a number of problems that can cause variations in the effluent pH, and tend to be labour and maintenance intensive. For example, the neutralizing agents commonly utilized are difficult to handle, hazardous, and often require special training for their proper use.

Despite recent developments in this area, there remains a need for a contact system for the neutralization of acidic waters, which is automatic, efficacious, and cost-effective.

GENERAL DESCRIPTION OF THE INVENTION

The present development proposes the use of magnesium oxide as a neutralizing agent, with acceptable alternatives being magnesium hydroxide and magnesium carbonate. The use of one of these three materials avoids the problems encountered in the prior art, by virtue of utilizing a stable and inert material as the neutralizing agent in an automatic self-regulating columnar system. Tests have shown that all three of these materials are safe and effective as neutralizing agents. They can be stored without any special precautions, are readily available, and do not need any special training in their use and handling. The same is true of alternative materials that could be substituted for MgSO, namely magnesium hydroxide and magnesium carbonate.

Thus, it is an aspect of this invention to provide a device and a process for increasing the pH of an aqueous stream, utilizing a bed of a water-insoluble, alkaline salt particulate.

In particular, this invention provides a device for increasing the pH of an aqueous stream, comprising:

a container having an inlet opening and an outlet opening, the outlet opening being located higher than the inlet opening, the container having between said openings a reactor portion with a substantially upright axis and a cross-section which increases upwardly, an inlet conduit connected to said inlet opening, an outlet conduit connected to said outlet opening, means for moving the aqueous stream through said inlet conduit to said inlet opening, a bed of substantially water-insoluble alkaline salt particulate within said reactor portion of the container, the bed being such that, when the pH of the inflowing aqueous stream is below 7, contact between the said particulate and the aqueous stream is sufficient to raise the pH of the outflowing aqueous stream to a level above that of the inflowing aqueous stream.

Further, this invention provides a process for neutralizing an acidic aqueous stream utilizing a device which includes:

a container having an inlet opening and an outlet opening, the outlet opening lying above the inlet opening, an inlet conduit connected to said inlet opening, an outlet conduit connected to said outlet opening, means for moving the aqueous stream through said inlet conduit to said inlet opening, the path defined by said inlet conduit having a highest inlet point, the path defined by said outlet conduit having a highest outlet point, the highest inlet point being above the highest outlet point, whereby the difference in elevation between the two points establishes a hydraulic head promoting upward movement of the aqueous stream through the container from the inlet opening to the outlet opening, a bed of substantially water-insoluble, alkaline salt particulate within the container between the inlet opening and the outlet opening, the process comprising pumping the aqueous stream at a pH less than 7 to said highest inlet point and allowing the said hydraulic head to cause the aqueous stream to flow into the container at said inlet opening, and from there to pass upwardly through the bed to said outlet opening, and adjusting one or both of:

the hydraulic head, b) the make-up of the bed, to ensure that passage of the aqueous stream through the bed increases the pH of the aqueous stream, but that the speed of upward aqueous stream movement is not so high as to entrain any of the particles in the particulate bed sufficiently to carry them out the outlet opening.

Finally, this invention provides an apparatus for increasing the pH of an aqueous stream, comprising:

a container having an inlet opening and an outlet opening, the outlet opening being located higher than the inlet opening, the container having between said openings a reactor portion with a substantially upright axis, an inlet conduit connected to said inlet opening, an outlet conduit connected to said outlet opening, the path defined by said inlet conduit having a highest inlet point, and the path defined by said outlet conduit having a highest outlet point, the highest inlet point being above the highest outlet point, whereby the elevational difference between the two points establishes a hydraulic head promoting upward movement of the aqueous stream through said portion of the container;

means for moving the aqueous stream through said inlet conduit to said inlet opening, and a bed of substantially water-insoluble alkaline salt particulate within reactor portion of the container, the bed being such that, when the pH of the inflowing aqueous stream is below 7, contact between the said particulate and the aqueous stream is sufficient to raise the pH of the outflowing aqueous stream to a level above that of the inflowing aqueous stream.

GENERAL DESCRIPTION OF THE DRAWINGS

Two embodiments of this invention are illustrated in the accompanying drawings, in which like numerals denote like parts throughout the several views, and in which.

DETAILED DESCRIPTION OF THE DRAWINGS

Figure 1:
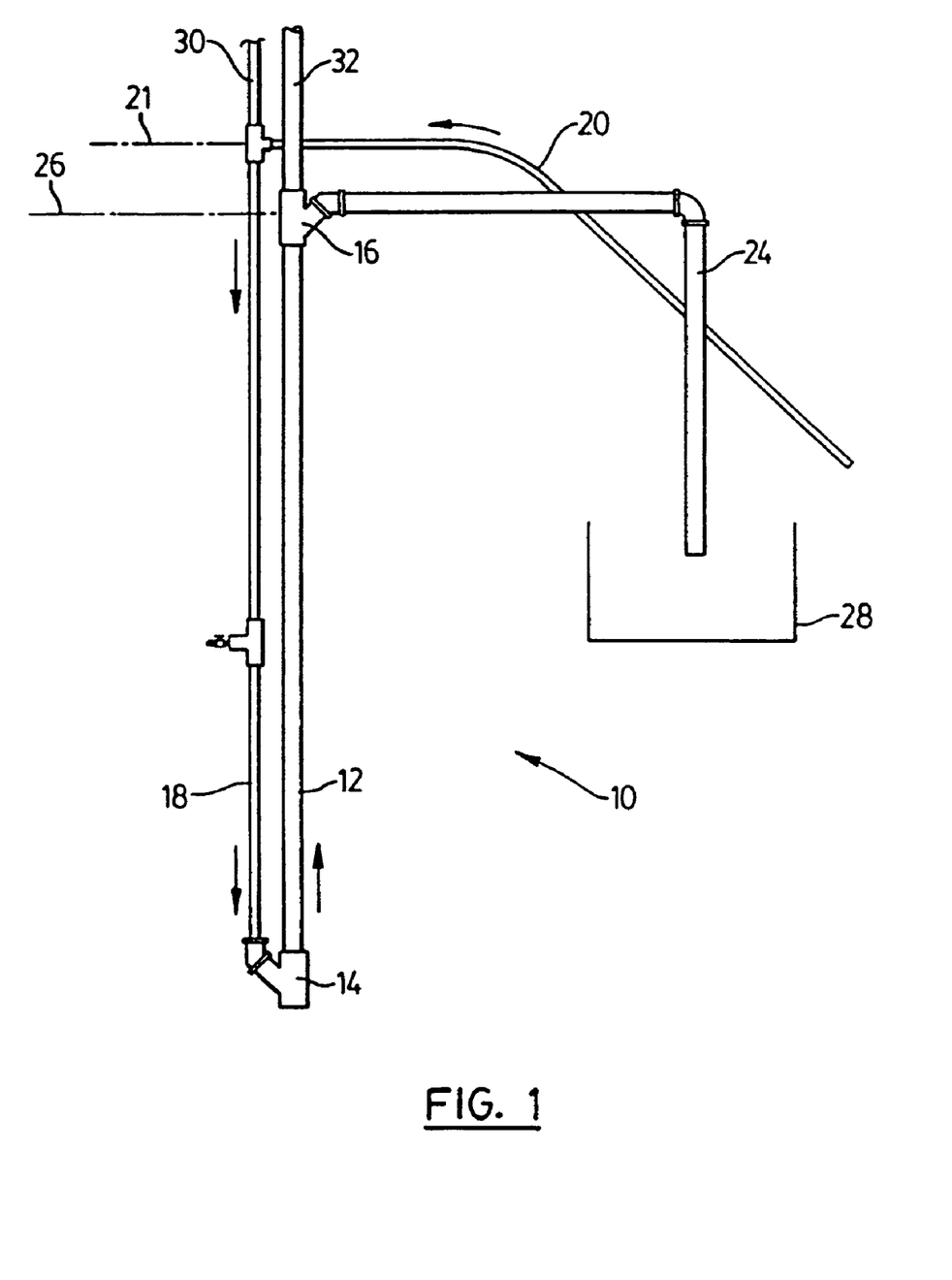
FIG. 1 is a schematic, side-elevational view of a testing apparatus for performing the invention.

In FIG. 1 there is illustrated a testing apparatus 10 for increasing the pH of an aqueous stream, the apparatus 10 including a container 12 in the form of a pipe extending vertically. A clear 2" PVC pipe was utilized. The container 12 has an inlet opening 14 adjacent the bottom and also an outlet opening 16 above the inlet opening 14. An inlet conduit 18 is connected to the inlet opening 14 and connects with an inlet hose 20 along which the aqueous stream flows to reach the inlet conduit 18.

The path defined by the inlet conduit 18 and the inlet hose 20 has a highest inlet point the elevation of which is represented by the horizontal line 21.

The apparatus 10 further includes an outlet conduit 24 connected to the outlet opening 16. The path defined by the outlet conduit 24 has a highest outlet point shown by the horizontal line 26. Since the highest inlet point (22) lies above the highest outlet point (26), the elevational difference between the two points establishes a hydraulic head promoting upward movement of the aqueous stream through the container 12 from the inlet opening 14 to the outlet opening 16.

In the testing apparatus illustrated in FIG. 1, a sink 28 is provided to receive the aqueous stream exiting from the outlet conduit 24. This allows sampling of the outlet stream, accurate flow measurement, etc.

Within the container 12, there is a bed of substantially water-insoluble, alkaline salt particulate between the inlet opening 14 and the outlet opening 16. The bed is such that, when the pH of the inflowing aqueous stream is below 7, contact between the particulate and the aqueous stream is sufficient to raise the pH of the outflowing aqueous stream above that of the inflowing aqueous stream.

The test results given below were achieved using magnesium oxide (MgSO) as the alkaline salt particulate, although it is considered that magnesium hydroxide and magnesium carbonate would also perform the pH adjustment required.

As shown in FIG. 1, the container 12 also has an upward extension 32, this being primarily for the purpose of allowing granular MgSO to enter the container 12, and then settle to form the bed.

Figure 2:
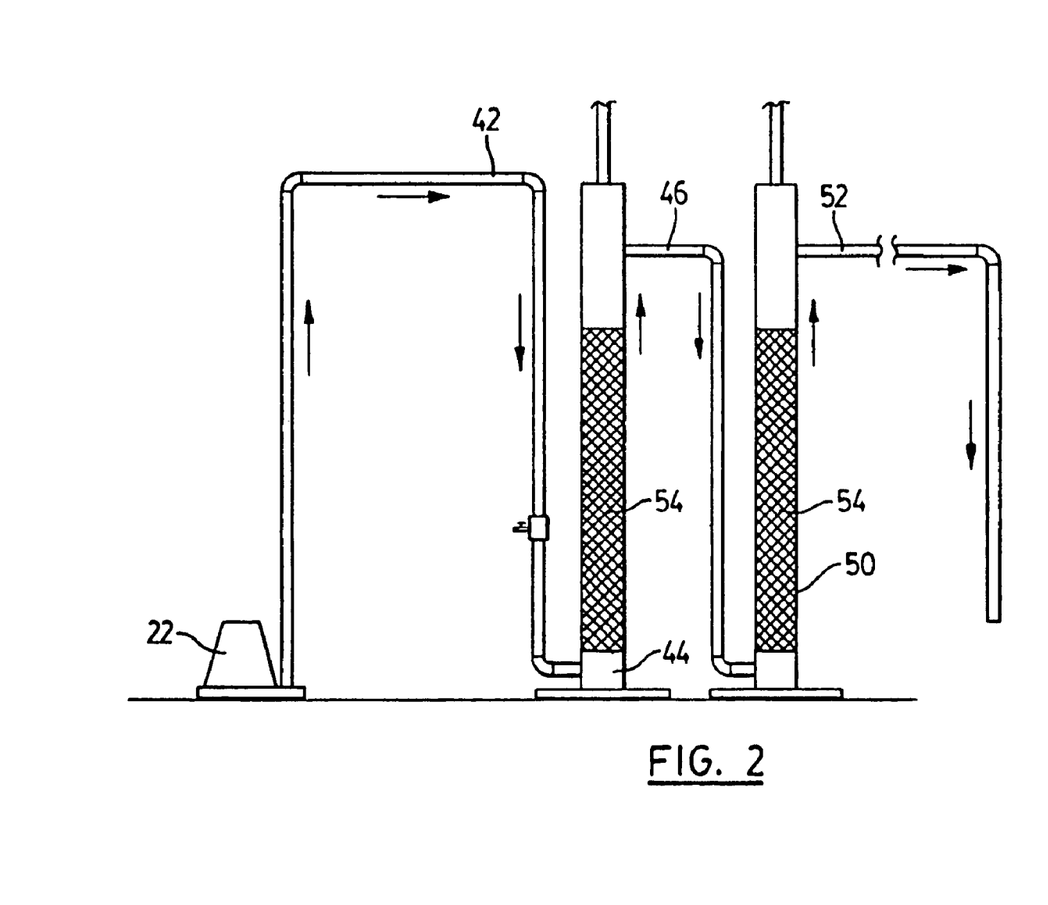
FIG. 2 is a schematic, side-elevational view of a treatment system for performing the invention on a commercial scale.

Attention is now directed to FIG. 2, which shows a proposed wastewater treatment system constructed on a commercial scale.

As can be seen, the pump 22 pumps an aqueous stream from a primary treatment unit (not seen), along a wastewater inlet conduit 42, the uppermost point of which defines the highest inlet point. The conduit 42 opens into the bottom region of a first container 44, while an outlet conduit 46 is connected to the container 44 at a location above the inlet opening. The upper portion of the outlet conduit 46 defines the highest outlet point such that, as with the test embodiment illustrated in FIG. 1, the difference in vertical height between the conduits 42 and 46 determines the hydraulic head promoting upward movement of the aqueous stream through the container 44.

The installation shown in FIG. 2 is a multiple stage unit, which is why the outlet conduit 46 from the first container 44 becomes the inlet conduit for the second container 50, which in turn has its own outlet conduit 52. In FIG. 2, the middle portions of the containers 44 and 50 receive the particulate MgSO, shown shaded at 54.

Inflow pH levels are not critical. The lower the pH level, the more aggressive will be the reaction, however the apparatus can deal with a wide range of pH levels, such that the aqueous stream tends to end up in the 9-10 range (depending on the temperature of the inflow water).

If the waste inflow has a very low pH (for example 2% acid waste, i.e. pH is 0), the reaction is highly active and heat is generated. However, the flow rates preferred for use with the present procedure (0.5-1.0 gal/min for a 2" diameter reactor) are sufficient to cool the process and break up the MgSO granules. If the magnesium oxide granules become excessively hot, they tend to form balls which subsequently break up due to the inflow velocities. As the pH increases to the 5-7 range, the reaction slows dramatically. It is important to remember that MgSO is slightly soluble in water at a pH level of 7.0. This minor level of solubility increases the pH level up to the 9-10 range, depending on the temperature of the inflowing liquid. In the process under discussion, it is possible to have more than one reactor in series (as with the installation shown in FIG. 2) to increase the outlet pH to the range of 7.5-9.5 (as preferred by environmental authorities). If a predetermined outlet pH level of treated acid waste is desired, controlling the duration of MgSO in the reactor and setting the flow rate will achieve a fixed desired rate.

It is possible to automate the system to reduce reactor/time exposure by flow rate or packing size, to achieve a desired pH.

With regard to the fluidized particulate bed, it should be noted that the aggregate of MgSO has voids or spaces which allow percolation of wastewater or water which may include suspended solids. Since the present system works best when water is introduced at the bottom of the column or reactor and taken out at the top, the water will easily progress through the voids of the aggregate. However, if the flow rates are increased, then the increased volume of water may cause movement of the MgSO aggregate to enlarge the voids in order to facilitate this increase in flow.

Flows may be increased to:
  increase the rate of reaction
  cause the aggregate to knock together which displaces reaction by-products or slime adsorption, etc.
  create flow rates which will force Suspended Solids or other solids or sludge up through the aggregate. If such solids have a higher S.G. than MgSO, then they will be retained in the reactor column.

Experimental work suggests that an expansion zone of 30% MgSO is needed for aggressive flow rates. As an example, if the bed of MgSO in the column is three feet long (measured vertically from bottom to top), it will require approximately another foot per column expansion for higher end flow rates.

It has been found experimentally that it is possible to pump at a faster rate than the head required to force the aqueous stream through the column of MgSO. However, it was noted that:

At the starting point, a higher head is required to start the flow through the column. A 3 ft MgSO column, for example, requires 1 foot of head (on a gravity basis).

At a preferred flow rate (of up to 1 gallon for a 2" diameter reactor) the head was much less, as the flow enlarged the void openings, which reduced friction.

Figure 3:
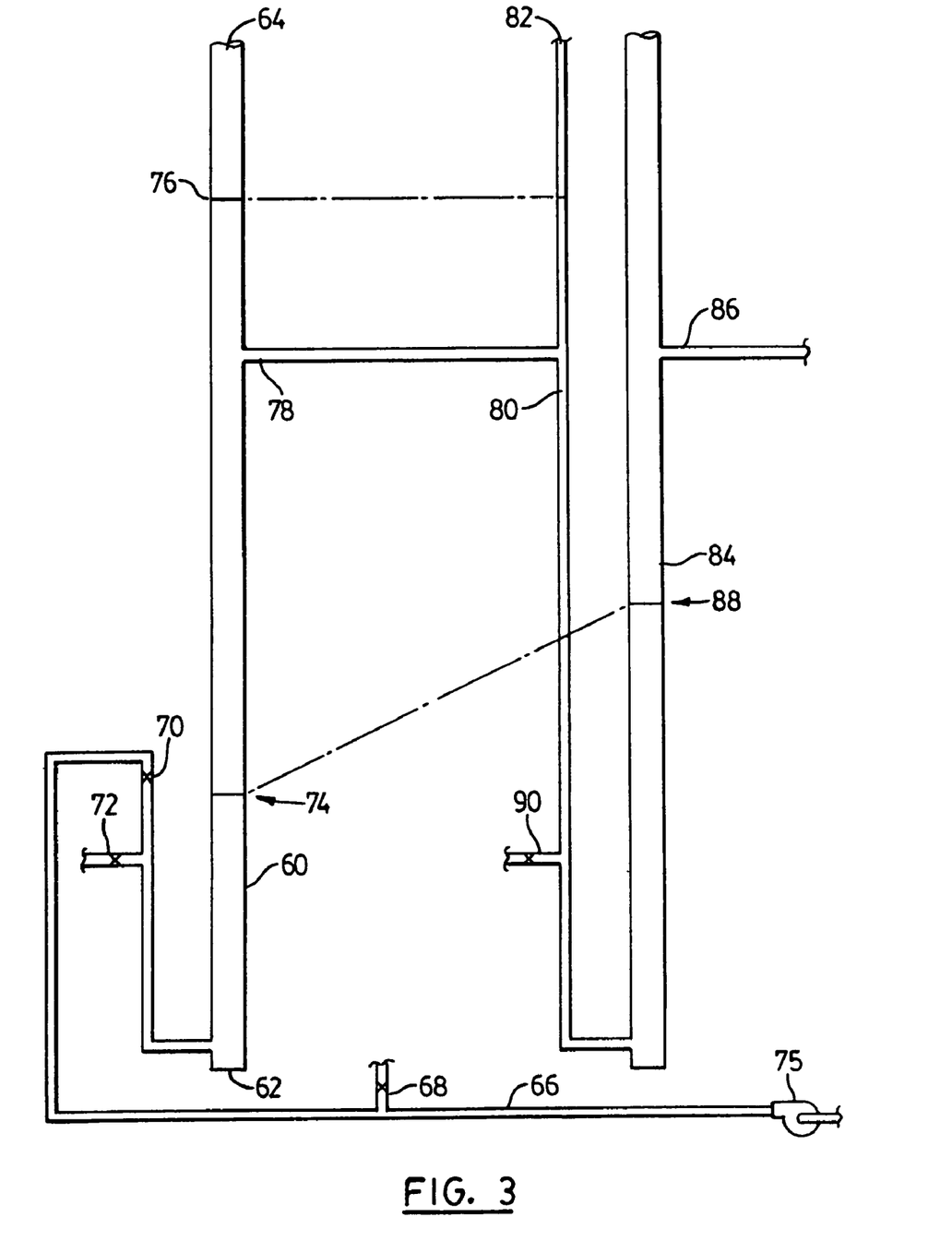
FIG. 3 is a schematic, side-elevational view of a further testing arrangement, utilizing two columns.

Attention is now directed to FIG. 3, illustrating a columnar test set-up which was used to make a series of measurements, utilizing two 3" diameter columns 60 and 84. In order to exactly measure water volumes, acid addition, pH at various points and the effect of the depth of MgSO bed on treatment efficiency, certain particular points of construction were incorporated.

To begin with, the first or upstream column 60 has a closed bottom end 62, and an open upper end 64. The column 60 is operated in a pressurized mode, receiving a solution from a conduit 66 equipped with an acid addition valve 68, a closure valve 70 and an input sampling tap 72. The bottom portion of the column 60 contains particulate MgSO to the level marked with the numeral 74.

Water is pumped into the conduit 66 from a pump 75, and enters the column 60 closely adjacent the bottom 62 of the column. The fact that the first column 60 is operating in a pressurized mode causes the hydraulic head to reach a certain height, depending upon the pressure. In FIG. 3 the hydraulic head level is marked with numeral 76.

The column 60 has an outlet at 78, and a conduit from the outlet 78 forms a T-junction with an upright conduit 80 which has an upwardly open top end 82, and a bottom end which connects to the bottom of the column 84. The column 84 is also upwardly open, and has a discharge port marked with the numeral 86. In the second column 84, the particulate bed of MgSO reaches from the bottom of the column 84 to a level marked with the numeral 88.

The upright conduit 80 has a sampling outlet at 90. It will now be realized that, while the first column 60 is operating in a pressurized mode, the second column 84 is operated on the basis of the hydraulic head generated after the first column, i.e. the vertical distance between the level 76 and the level 86.

The acid addition connection 68 allows the addition of metered amounts of acid into the water stream. This location is positioned sufficiently far ahead of the sampling point 72 to allow for sufficient mixing.

A metering pump (not shown) was used to meter calculated amounts of acid into the water in order to maintain a constant pre-set pH.

During the test, the water flow was measured using a large (50 litre) calibrated bucket.

Testing was carried out using a variety of flow rates. The flow rates were set to be highly turbulent at the maximum, without carry-over of MgSO particles, and at laminar flow at the low end. This provided a range of from 5 to 13 l/min. This should not preclude even lower flow rates with longer retention times, however it is assumed that treatment efficiency and cost of equipment may not warrant the use of oversized equipment. This point is of special concern where contaminants may be present in the effluent to be treated, in which case it will be beneficial to have any sludges that may form washed out of the treatment column continuously. Also, the rolling motion in a turbulent flow condition will keep the MgSO particles surface clean through attrition, and as a result will increase the treatment efficiency.

Utilizing the FIG. 3 apparatus, a series of test was conducted. The level of the MgSO was kept at approximately 18" in the first column and 26" in the second column.

| pH in | Column 1 pH | Column 2 pH | Flow-rate l/min | Comments |
|---|---|---|---|---|
| 2.0 | 3.4 | 5.6 | 5.3 | low turbulence |
| 1.7 | 2.8 | 5.5 | 5.3 | discharge light brown and cloudy |
| 1.6 | 2.4 | 5.5 | 5.3 | discharge light brown and cloudy |
| 1.4 | 2.1 | 5.5 | 5.3 | |
| 2.1 | 5.7 | 9.1 | 3.3 | laminar flow |
| 2.0 | 4.1 | 5.7 | 12.0 | |
| 2.4 | 4.6 | 5.7 | 12.2 | |
| 3.0 | 5.2 | 5.9 | 12.2 | |
| 6.0 | 6.2 | 6.6 | 12.2 | |
| 3.7 | 5.6 | 6.0 | 12.2 | |
| 2.8 | 5.6 | 6.3 | 5.7 | min. turbulence |
| 2.4 | 5.6 | 6.3 | 5.7 | |

As a result of the tests and the results just described, a smaller test unit (with 1" diameter columns) was constructed. This unit was built as a portable unit to be used for in-plant demonstration as well as to permit the use of smaller samples for testing, as may be obtained from various industries. The mode of operation uses pump pressure to push the wastewater through the column.

The smaller unit was successfully tested using flow rates from 0.3 l/min to 1.7 l/min (laminar flow to good turbulence without carry-over). Higher flow rates will also be possible, depending on the depth of the MgSO bed. Also, separator modules can be attached to reduce the chances of carry-over and to allow any sludges to be separated from the exit.

| pH in | pH outFlow | l/min | MgO level inches |
|---|---|---|---|
| 2.0 | 3.3 | 1.0 | 16.5 |
| 2.0 | 3.0 | 1.2 | |
| 1.7 | 2.3 | 1.5 | |
| 1.7 | 2.7 | 1.0 | |
| 2.4 | 5.4 | 1.0 | |
| 2.4 | 3.9 | 1.5 | |
| 2.4 | 5.7 | 1.2 | 26.0 |
| 2.4 | 6.0 | 1.0 | |

TEST RESULTS WITH FIG. 1 EMBODIMENT

Procedure

1. A 5 US gallon bucket and a timer were used to determine flow variation from the tap.

2. Headloss through the system was determined using a measuring tape and the level of water in the inlet and outlet pipes. The headloss was plotted against flow.

3. The granular MgSO was added to the outlet pipe from the top opening and then allowed to settle. Enough MgSO was added to provide 12 inches contact from the bottom of the pipe.

4. Steps 1 and 2 were repeated with the MgSO in place at 12, 24 and 36 inches height.

5. At various flows and levels of MgSO, Hydrochloric acid was metered into the system and measurements of water temperature and pH before and after contact with the MgSO were recorded. The pre-contact pH was recorded at 5 minute intervals and post-contact pH two minutes following a pre-sample measurement (2 minutes was the approximate residence time of the water from the pre to post-contact sampling points).

6. The system was shock loaded with a large quantity of acid and observations were recorded.

7. Step 5 and 6 were repeated for Sulphuric, Phosphoric and Carbonic Acids.

Results and Observations

Test A
Acid: Hydrochloric Flow: 1 IGPM MgO Level: 36 inches
Temperature: 64°F. Acid addition: ≈40 drops/min Acid Used: 49 mL

|  | pH | |
| --- | --- | --- |
| Time (min) | Pre-contact | Post-contact |
| 0 | 3.0 | 5.7 |
| 5 | 2.6 | 5.9 |
| 10 | 2.7 | 5.7 |
| 15 | 2.5 | 5.7 |
| 20 | 2.5 | 5.8 |

Test B
Acid: Hydrochloric Flow: 0.35 IGPM MgO Level: 36 inches
Temperature: 64°F. Acid addition: ≈20 drops/min Acid used: 21 mL

|  | pH | |
| --- | --- | --- |
| Time (min) | Pre-contact | Post-contact |
| 0 | 2.6 | 6.9 |
| 5 | 2.4 | 6.2 |
| 10 | 2.1 | 6.2 |
| 15 | 2.4 | 6.4 |
| 20 | 2.6 | 6.5 |

Test C
Acid: Hydrochloric Flow: 0.72 IGPM MgO Level: 55 inches
Temperature: 64°F. Acid addition: ≈40 drops/min Acid used: 52 mL

|  | pH | |
| --- | --- | --- |
| Time (min) | Pre-contact | Post-contact |
| 0 | 2.6 | 9.8* |
| 5 | 2.9 | 6.7 |
| 10 | 2.6 | 6.4 |
| 15 | 2.5 | 6.2 |
| 20 | 2.4 | 6.2 |

*small suspended solids carrying over and out with effluent

Test D
Acid: Hydrochloric Flow: 0.72 IGPM MgO Level: 55 inches
Temperature: 64°F. Acid addition: ≈80 drops/min Acid used: 96 mL

|  | pH | |
| --- | --- | --- |
| Time (min) | Pre-contact | Post-contact |
| 0 | 2.2 | 6.0 |
| 5 | 2.0 | 6.0 |
| 10 | 1.9 | 6.0 |
| 15 | —* | 6.1 |
| 20 | 2.4 | 6.0 |
| 25 | 2.7 | 6.2 |
| 30 | — | 7.8 |
| 35 | — | 8.4 |

*acid addition shut off

Test E
Acid: Hydrochloric Flow: 0.79 IGPM MgO Level: 57 inches
Temperature: 64°F. Acid addition: ≈40 drops/min Acid used: —

|  | pH | |
| --- | --- | --- |
| Time (min) | Pre-contact | Post-contact |
| 0 | 3.2 | 9.1 |
| 5 | 3.3 | 8.6 |
| 10 | 3.3 | 9.2 |
| 15 | 6.0* | — |

*ran out of acid in burette

Test F (Shock Loading)
Acid: Hydrochloric Flow: 0.79 IGPM MgO Level: 36 inches
Temperature: 64°F. Acid addition: ≈ Acid used: 150 mL

|  | pH | |
| --- | --- | --- |
| Time (mm) | Pre-contact | Post-contact |
| 0- | 1.5 | 6.0 |
| 2 | 1.7 | 6.2* |
| 4 | 1.8 | 6.3 |
| 6 | 2.0 | 6.6 |
| 8 | 2.0 | 6.7 |
| 10 | 2.3 | 7.2 |
| 12 | 2.4 | 8.3*** |
| 14 | 2.4 | 7.0 |
| 16 | 2.4 | 7.2 |
| 18 | 2.0 | 9.0*** |
| 20 | 3.3 | 8.6 |
| 22 | 4.3 | 9.5 |
| 24 | 4.4 | 9.6 |
| 26 | 6.1 | 9.4 |
| 28 | 2.7 | 9.5 |
| 30 | 2.3 | 9.7 |
| 35 | 6.8 | 9.8 |
| 40 | 7.0 | 9.9 |
| 45 | 6.7 | 9.9 |

*effluent was milky from this point
**effluent was noticeably clearer from this point
***effluent was clear from this point Test G
Acid: Sulphuric Flow: 0.80 IGPM MgO Level: 55 inches
Temperature: 65°F. Acid addition: ≈40 drops/min Acid used: 21 mL

| Time (mm) | pH Pre-contact | pH Post-contact |
|---|---|---|
| 0 | 3.3 | 7.1 |
| 5 | 3.0 | 6.9 |
| 10 | 2.7 | 6.9 |
| 15 | 2.9 | 7.1 |
| 20 | 1.9 | 7.0 |
| 25 | 3.2 | 7.4 |

Test H
Acid: Sulphuric Flow: 0.80 IGPM MgO Level: 55 inches
Temperature: 65°F. Acid addition: ≈80 drops/min Acid used: 50 mL

| Time (mm) | pH Pre-contact | pH Post-contact |
|---|---|---|
| 0 | 2.2 | 6.5 |
| 5 | 1.7 | 6.7 |
| 10 | 2.2 | 6.8 |
| 15 | 2.3 | 7.0 |
| 20 | 2.1 | 6.8 |

Test I
Acid: Sulphuric Flow: 0.34 IGPM MgO Level: 55 inches
Temperature: 65°F. Acid addition: ≈40 drops/min Acid used: 19 mL

| Time (min) | pH Pre-contact | pH Post-contact |
|---|---|---|
| 0 | 2.9 | 9.6 |
| 5 | 2.6 | 9.9 |
| 10 | 1.9 | 9.6 |
| 15 | 2.7 | 10.1 |
| 20 | 1.5 | 9.8 |
| 25 | 2.6 | 10.0 |

Test J (Shock Loading)
Acid: Sulphuric Flow: see notes MgO Level: 55 inches
Temperature: see notes Acid addition: ≈— Acid used: 200 mL

| Time (min) | pH Pre-contact | pH Post-contact |
|---|---|---|
| 0 | 0.3 | 8.1* |
| 2 | 2.2 | 8.8 |
| 4 | 6.1 | 9.4** |
| 6 | 6.7 | 9.6 |
| 8 | 7.1 | 9.8 |
| 10 | 7.3 | 9.6 |
| 12 | 7.4 | 9.9 |

*light brown, opaque, very warm (almost hot) effluent
**MgO clumped severely and began to exit the system
**flow needed to be reduced immediately from 0.85 IGPM to prevent further escape of MgO TEST K (SHOCK LOADING)
Acid: Sulphuric Flow: 1.04 IGPM MgO Level: 50 inches
Temperature: see notes Acid addition: ≈— Acid used: 100 mL

| Time (min) | pH Pre-contact | pH Post-contact |
|---|---|---|
| 0 | 1.2 | 6.2 |
| 2 | 1.5 | 6.4 |
| 4 | 1.8 | 6.3 |
| 6 | 2.1 | 6.3 |
| 8 | 2.3 | 6.3 |
| 10 | 2.8 | 6.4 |
| 15 | 2.9 | 6.6 |
| 20 | 5.5 | 7.0 |
| 25 | 6.2 | 7.5 |

Test L
Acid: Phosphoric Flow: 1.05 IGPM MgO Level: 48 inches
Temperature: 66°F. Acid addition: ≈140 drops/min Acid used: 140 mL

| Time (min) | pH Pre-contact | pH Post-contact* |
|---|---|---|
| 0 | 3.0 | 6.6 |
| 5 | 2.7 | 6.5 |
| 10 | 2.5 | 6.5 |
| 15 | 2.4 | 6.5 |
| 20 | 2.3 | 6.5 |
| 25 | 2.4 | 6.7 |

*translucent (whitish) effluent

Test M
Acid: Phosphoric Flow: 0.55 IGPM MgO Level: 48 inches
Temperature: 66°F. Acid addition: ≈70 drops/min Acid used: 60 mL

| Time (min) | pH Pre-contact | pH Post-contact* |
|---|---|---|
| 0 | 2.2 | 6.8 |
| 5 | 1.8 | 6.7 |
| 10 | 2.0 | 6.6 |
| 15 | 1.9 | 6.9 |
| 20 | 2.0 | 6.8 |
| 25 | 2.2 | 7.1 |

*clear effluent

Test N (Shock Loading)
Acid: Phosphoric Flow: 1.00 IGPM MgO Level: 48 inches
Temperature: 65°F. Acid addition: ≈Acid used: 100 mL

| Time (min) | pH Pre-contact | pH Post-contact |
|---|---|---|
| 0 | 1.8 | 5.7 |
| 2 | 2.2 | 6.3 |
| 4 | 2.4 | 6.7 |
| 6 | 2.7 | 6.9 |
| 8 | 2.9 | 6.9 |
| 10 | 3.1 | 7.1 |
| 15 | 6.2 | 7.1 |
| 20 | 6.5 | 7.1 |

Test O (Sept. 4/98) - Test not performed by F. Karmali
Acid: Carbonic Flow: .87 IGPM MgO Level: 48 inches
Temperature: - Acid addition: ≈— Acid used: —

| Time (mm) | pH Pre-contact | pH Post-contact |
|---|---|---|
| 0 | 7.1 | 9.4 |
| 10 | 4.9 | 6.0 |
| 15 | 5.5 | 6.1 |
| 20 | 5.3 | 6.0 |
| 25 | 5.4 | 6.0 |
| 30 | 5.2 | 5.9 |
| 35 | 5.2 | 5.9 |
| 40 | 5.2 | 5.9 |
| 45 | 5.2 | 5.9 |
| 60 | 5.2 | 5.8 |
| 75 | 5.2 | 5.8 |
| 90 | 5.2 | 5.8 |
| 105 | 5.2 | 5.8 |
| 120 | 5.2 | 5.9 |
| 135 | 5.2 | 5.9 |
| 165 | 5.2 | 5.9 |
| 180 | 5.2 | 5.9 |
| 210 | 5.2 | 5.9 |
| 225 | 5.2 | 5.9 |
| 240 | 5.2 | 6.0 |
| 255 | 5.2 | 6.0 |
| 270 | 5.2 | 6.0 |
| 300 | 5.2 | 6.0 |
| 330 | 5.2 | 6.1 |
| 360 | 5.2 | 6.0 |
| 375 | 5.1 | 6.0 |
| 390 | 5.0 | 6.1 |
| 395 | 5.1 | 6.1 |
| 400 | 5.1 | 6.0* |
| 405 | 6.9 | 8.6 |

*$CO_2$ shut off.

The data given above, collected during the neutralization of various acids using MgSO (magnesium oxide) in a static application has clearly indicated that the process can be commercially applied wherever a problem arises with low pH wastewater.

By using a static method, minimal mechanical equipment will be needed, reducing the need for maintenance, manpower and energy. Also, due to the chemical properties of MgSO, commonly used expensive electronic control systems, which are also prone to failure, can be largely eliminated.

The testing was carried out using a variety of acids: sulphuric, hydrochloric and acetic acids being used in a variety of test configurations.

After testing using the apparatus designs shown in FIGS. 1, 2 and 3, a number of different physical configurations where evaluated. It was eventually realized that a contact column having an increasing diameter in the upward direction produced the superior results. This configuration also turned out to be the most effective in treating a wide variety of acid concentrations in a relatively small test unit. Based on the results obtained thus far, it has become clear that a treatment column is space and capacity effective when it is substantially conical in shape, possibly with a variable ratio of diameter changes over length, depending on flow rates and application. The increase in diameter is in the direction of flow, which must be vertically upward through the MgSO bed.

Since this process is governed by the various chemical reactions between different acids and the MgSO—$Mg(OH)_2$ equilibrium, design parameters will be slightly different between different applications. However, the basic principle as described above will remain the same for all cases, using a substantially conical treatment column with the liquid to be treated flowing in an upward motion (or a column with stepped cylindrical sections having progressively increasing diameters in the upward direction, and with adjacent pairs of the cylindrical sections being linked by frusto-conical transitions).

Figure 4:
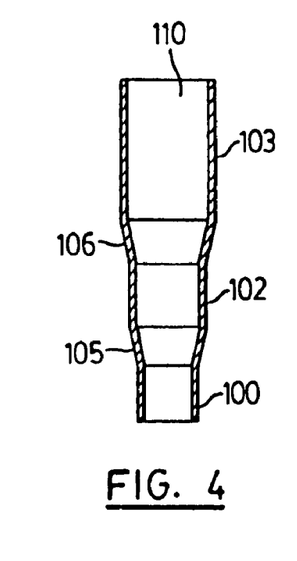
FIG. 4 is an axial sectional view through an alternative component of the testing apparatus described herein.

It has been observed that good turbulence throughout the MgSO column can be maintained by using a step-wise progressively widening column as just described. FIG. 4 shows an axial sectional view through such a column. In FIG. 4, three cylindrical segments 100, 102 and 103 are separated by two frusto-conical portions 105 and 106. It will be noted that the diameter of the cylindrical portions 100, 102 and 103 increases with height, resulting in an internal passageway 110 with a diameter that widens in stages. The MgSO column in a vertical pipe such that shown in FIG. 4 is assumed to be distributed along the length or a portion of the length of the column. In this system the flowing liquid separates the suspended solid particles by weight and size. By contrast, in a straight column with a uniform flow rate throughout, the smaller and lighter particles could be ejected at the top, even though the rate of flow may be barely sufficient to suspend the heavier particles at the bottom. By conically expanding the column towards the top (i.e. progressively increasing its diameter), the velocity of the liquid moving upwards is progressively reduced and all particles can easily be kept in suspension at their appropriate levels. With a physical configuration such as this, high flow rates giving good turbulence can be achieved without loss of MgSO. At the same time the actual contact time can be lengthened, giving better acid neutralization in a smaller and more efficient unit. Preliminary test data are given below to illustrate the effectiveness of this approach.

SUMMARY OF TEST RESULTS

| Flow [l/min] | pH in | pH out #1 | pH out #2 | Comments |
|---|---|---|---|---|
| Two column tests (3" diameter columns - cylindrical) | | | | |
| 3.3 | 7.3 | 8.9 | 9.6 | tap water |
| 6.3 | 7.3 | 7.8 | 9.1 | |
| 9 | 7.3 | 7.6 | 9.8 | |
| 12.2 | 7.3 | 7.5 | 8.6 | |
| 3.3 | 2.1 | 5.7 | 9.1 | sulphuric acid |
| 5.3 | 2 | 3.4 | 5.6 | |
| 5.3 | 1.7 | 2.8 | 5.5 | |
| 5.3 | 1.6 | 2.4 | 5.5 | |
| 5.3 | 1.4 | 2.1 | 5.5 | |
| 5.7 | 2.8 | 5.6 | 6.3 | |
| 5.7 | 2.4 | 5.6 | 6.3 | |
| 12 | 2 | 4.1 | 5.7 | |
| 12.2 | 2.4 | 4.6 | 5.7 | |
| 12.2 | 3 | 5.2 | 5.9 | |
| 12.2 | 6 | 6.2 | 6.6 | |
| 12.2 | 3.7 | 5.6 | 6 | |
| One column test (1" diameter column - cylindrical) | | | | |
| 1 | 2 | 3.3 | | |
| 1 | 1.7 | 2.7 | | |
| 1 | 2.4 | 5.4 | | |
| 1 | 2.4 | 6 | | |
| 1 | 3.2 | 6.5 | | |
| 1.2 | 2 | 3 | | |
| 1.2 | 2.4 | 5.7 | | |
| 1.4 | 3 | 6.3 | | |

-continued

| Flow [l/min] | pH in | pH out #1 | pH out #2 | Comments |
|---|---|---|---|---|
| 1.5 | 1.7 | 2.3 | | |
| 1.5 | 2.4 | 3.9 | | |
| 1.6 | 3.2 | 6.3 | | |
| 1.7 | 2.9 | 5.9 | | |
| 2 | 3.1 | 6.1 | | MgO reaching into over flow section (3" diameter) |
| 2 | 3.3 | 6.2 | | |
| 2 | 4.3 | 6.2 | | |
| 2 | 5.3 | 6.3 | | |
| 2 | 6.8 | 8.3 | | |
| Tapered column test (1" to 3" diameter) | | | | |
| 5 | 3.5 | 6.4 | | Acetic acid (5% vinegar in various dilutions) |
| 5 | 3.6 | 6.2 | | |
| 5 | 3.9 | 7.1 | | |
| 5 | 2.4 | 6.5 | | sulphuric acid |
| 5 | 2.6 | 6.7 | | |
| 5 | 2 | 6.4 | | hydrochloric acid |
| 5 | 1.7 | 7.3 | | hydrochloric acid, increased MgO in column |
| 5 | 1.9 | 8.4 | | |
| 5 | 2.4 | 8.8 | | |
| 5 | 3 | 9.1 | | |
| 2.6 | 1.5 | 8.9 | | hydrochloric, iron sulphate added |
| 3 | 2 | 8.9 | | effluent cloudy, settling time 2 hrs+ |
| 3.1 | 1.7 | 8.3 | | |
| 5.9 | 2.3 | 7.1 | | |
| 6.7 | 2.4 | 6.8 | | |

Figure 5:
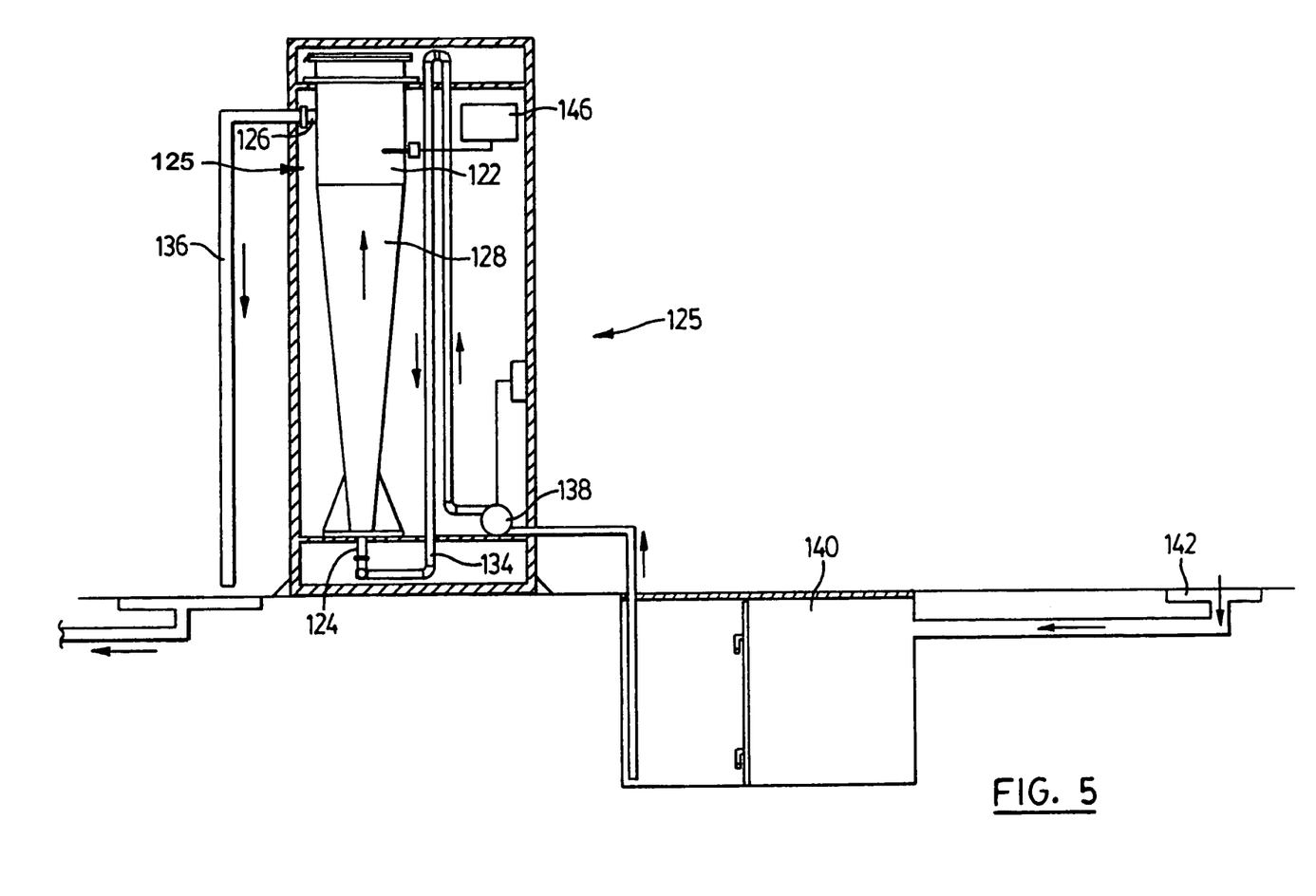
FIG. 5 is a schematic, side-elevational view of a small commercial application embodying the present invention.

Attention is now directed to FIG. 5, illustrating a small commercial application of the conical embodiment of this invention.

In FIG. 5, a device 125 for increasing the pH of an aqueous stream includes a container 122 having at the bottom an inlet opening 124 and a discharge or outlet opening 126 adjacent the top. It will be noted that the outlet opening 126 is located higher than the inlet opening 124, and further that the container has, between the openings 124 and 126, a substantially conical portion 128 which has a substantially upright axis (axis of symmetry), and a cross-section (circular) which increases upwardly. In other words, the apex of the conical portion 128 is downward.

An inlet conduit 134 is connected to the inlet opening 124, while an outlet conduit 136 constitutes a discharge capability.

A pump 138 constitutes means for moving an aqueous stream through the inlet conduit 134 to the inlet opening 124. The aqueous stream is drawn from a sump pit 140, which collects affluent from floor drains such as that shown at 142, and the like.

Contained within the conical portion 128 of the container 122 is a bed of substantially water-insoluble alkaline salt particulate. The bed is such that, when the pH of the inflowing aqueous stream is below 7, contact between said particulate and the aqueous stream is sufficient to raise the pH of the outflowing aqueous stream to a level above that of the inflowing aqueous stream. A porous screen is provided below the particulate.

In FIG. 5 it will also be noted that the inlet conduit 134 has a "highest inlet point" which lies above the "highest outlet point" constituted by the upper end of the outlet conduit 136.

If desired, for monitoring purposes, a pH meter 146 may be utilized to keep track of the pH of the affluent after passing through the particulate bed.

Figure 6:
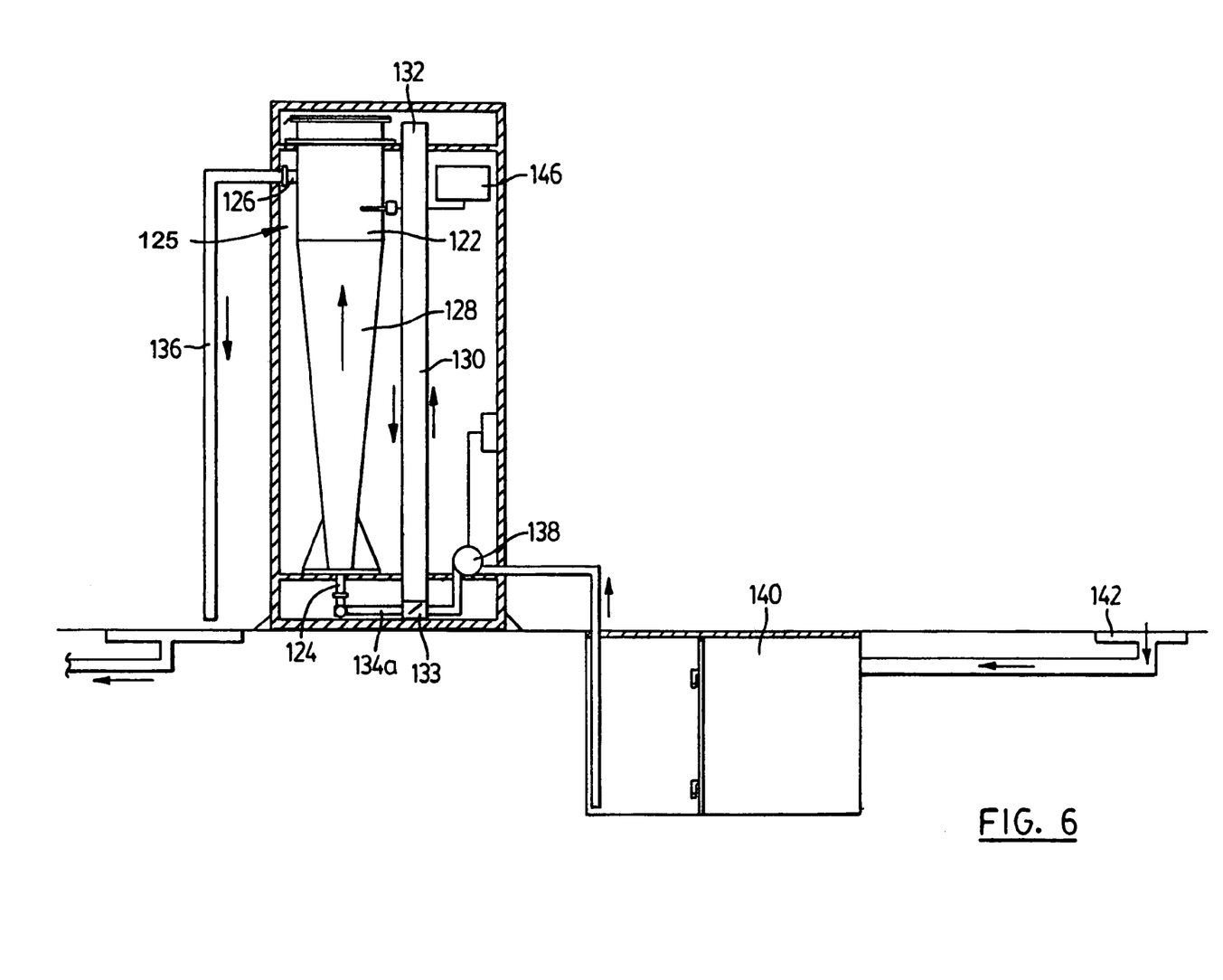
FIG. 6 is a view, similar to FIG. 5, of an alternative embodiment of this invention.

The apparatus shown in FIG. 6 differs from that in FIG. 5 in that the folded conduit 134 in FIG. 5 is replaced with an upstanding pipe 130 having an open top 132 into which the particulate material can be charged. At the bottom, the pipe 130 communicates with an inlet feed device 133 which meters the particulate material into the conduit 134a, without any danger that the pressurized aqueous stream coming from the pump 138 will back up into the pipe 130. Devices like that marked 133 are well known.

While several embodiments of this invention have been described hereinabove and illustrated in the accompanying drawings, it will be evident to those skilled in the art that changes and modifications may be made therein without departing from the essence of this invention, as set forth in the appended claims.

The invention claimed is:

1. An apparatus for increasing the pH of an input aqueous stream, comprising:
   a container having an inlet opening and an outlet opening, the outlet opening being located higher than the inlet opening, the container having between said inlet and outlet openings a reactor portion with a substantially upright axis;
   an inlet conduit connected to said inlet opening and receiving said input aqueous stream;
   a pump along said inlet conduit;
   an outlet conduit connected to said outlet opening, the path defined by said inlet conduit having a highest inlet point and the path defined by said outlet conduit having a highest outlet point, the highest inlet point being above the highest outlet point, whereby the elevational difference between the highest inlet point and the highest outlet point establishes a hydraulic head promoting upward movement of the aqueous stream through the reactor portion of the container; and
   a bed of substantially water-insoluble alkaline salt particulate within said reactor portion of the container, the bed being such that, when the pH of the aqueous stream entering the container via said inlet opening is below 7, contact between the particulate and the aqueous stream is sufficient to raise the pH of the aqueous stream to a level above that of the aqueous stream prior to exiting said container via said outlet opening.

2. The apparatus according to claim 1, wherein the reactor portion has a cross-section that increases upwardly.

3. The apparatus according to claim 1, in which the particulate is a material selected from a group consisting of: magnesium oxide, magnesium hydroxide, and magnesium carbonate.

4. The apparatus according to claim 3, wherein the particulate forms a fluidized bed.

5. The apparatus according to claim 4, further comprising a porous screen below the particulate.

6. The apparatus according to claim 1, wherein the particulate forms a fluidized bed.

7. The apparatus according to claim 1, further comprising a porous screen below the particulate.

8. An apparatus for increasing the pH of wastewater, comprising:
   a container having an inlet opening and an outlet opening, the outlet opening being located higher than the inlet opening, the container having between said inlet and outlet openings a reactor portion with a substantially upright axis;

an inlet conduit connected to said inlet opening and receiving said wastewater;

a pump along said inlet conduit;

an outlet conduit connected to said outlet opening, the path defined by said inlet conduit having a highest inlet point and the path defined by said outlet conduit having a highest outlet point, the highest inlet point being above the highest outlet point, whereby the elevational difference between the highest inlet point and the highest outlet point establishes a hydraulic head promoting upward movement of the wastewater through the reactor portion of the container; and a bed of substantially water-insoluble alkaline salt particulate within said reactor portion of the container, the bed being such that, when the pH of the wastewater entering the container via said inlet opening is below 7, contact between the particulate and the wastewater is sufficient to raise the pH of the wastewater to a level above that of the wastewater prior to exiting said container via said outlet opening.

9. The apparatus according to claim 8, wherein the reactor portion has a cross-section that increases upwardly.

10. The apparatus according to claim 8, wherein the particulate is a material selected from a group consisting of: magnesium oxide, magnesium hydroxide, and magnesium carbonate.

11. The apparatus according to claim 10, wherein the particulate forms a fluidized bed.

12. The apparatus according to claim 11, further comprising a porous screen below the particulate.

13. The apparatus according to claim 8, wherein the particulate forms a fluidized bed.

14. The apparatus according to claim 8, further comprising a porous screen below the particulate.

* * * * *